Figure 1:
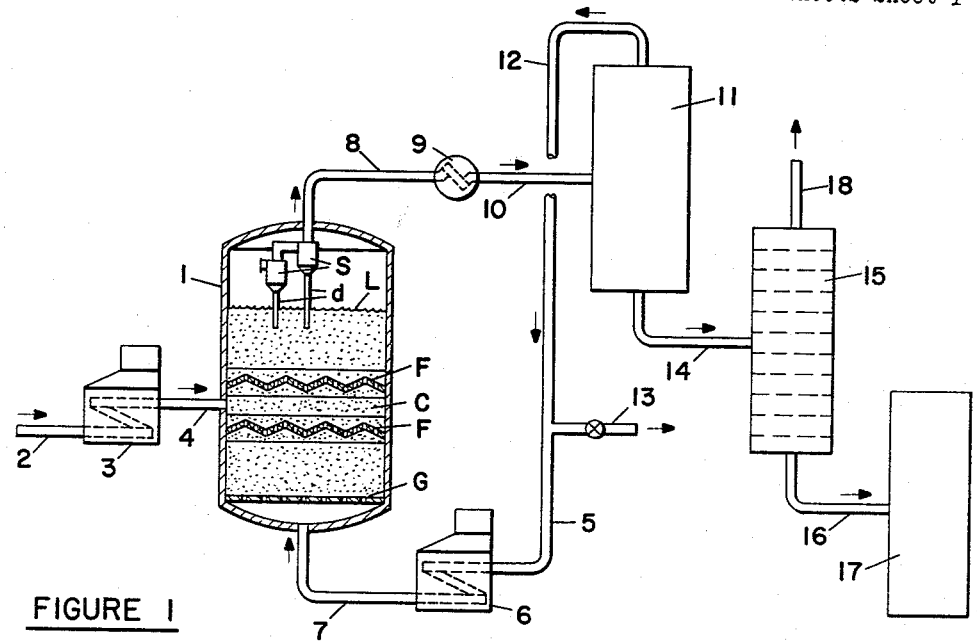

July 5, 1960

A. R. HUNTLEY ET AL 2,944,009

FLUIDIZED SOLIDS TECHNIQUE

Filed Sept. 3, 1957

2 Sheets-Sheet 1

Allan R. Huntley
Francis R. Russell   Inventors

By H. M. Fleyrer  Attorney

July 5, 1960    A. R. HUNTLEY ET AL    2,944,009
FLUIDIZED SOLIDS TECHNIQUE

Filed Sept. 3, 1957    2 Sheets-Sheet 2

Allan R. Huntley
Francis R. Russell    Inventors

By _____ Attorney

2,944,009
FLUIDIZED SOLIDS TECHNIQUE

Allan R. Huntley, Cranford, and Francis R. Russell, Mountainside, N.J., assignors to Esso Research and Engineering Company, a corporation of Delaware Filed Sept. 3, 1957, Ser. No. 681,575

13 Claims. (Cl. 208—155)

The present invention relates to improvements in processes employing the fluidized solids technique and to other operations involving the contacting of two or more phases, such as liquid-liquid contacting, e.g., during a solvent extraction of a material from a liquid by a liquid solvent. The present invention has particular application in the gasiform-solids contacting in systems in which gasiform materials, such as hydrocarbons, are contacted with a dry, powdered solid (reactant, catalyst or heat transfer agent) in the form of a dense, fluidized, liquid-simulating bed or mass.

Prior to this invention, the fluidized solids technique was well known and practiced commercially in this country and abroad on a large scale. The fluidized solids technique has been applied very successfully, for example, to the catalytic cracking of gas oil. In hydroforming, however, a process wherein the naphtha vapors to be hydroformed are caused to flow upwardly through a dense fluidized bed of catalyst at pressures considerably above atmospheric pressure, the gas-solids contacting has not been satisfactory due largely to the fact that the relatively low vapor velocity upwardly through the bed of catalyst permits the formation of relatively large gas bubbles causing channeling and bypassing without effective contact of portions of the upwardly flowing vapors with the catalyst particles and other unsatisfactory operating conditions. It has been proposed to employ spaced perforated baffles disposed within the bed of solids in an attempt to improve gas-solids contacting mainly by the prevention of vapor channeling and large gas bubble formation. Thus flat perforated baffles of high and low pressure drop have been disposed in reactors containing dense, fluidized beds of finely divided solids. However, these have not corrected the foregoing defects. Such gas channeling has been observed visually in laboratory tests in glass vessels provided with conventional horizontal tubes or plates, using air and water. These horizontal surfaces tended to agglomerate small bubbles into large ones, which flowed horizontally beneath the baffles and rose rapidly, forming channels along the wall. This channeling was also seen with air and fluidized solids. The problem is much worse when the baffle is tilted slightly from a true horizontal position, a condition which is likely to occur in large vessels. The net effect of conventional baffles in a fluidized bed can therefore be harmful. Furthermore, it has been also proposed to employ in place of flat perforated baffles various other types of baffles of different geometric configurations, such as baffles which are wave-like, undulating, corrugated and the like in shape. However, experiments have shown that such baffles are not satisfactory with respect to the above inter-phase contacting.

The main object of the present invention is to provide improved perforate baffle means of such form and construction and so disposed in a treating zone as to cause maximum contacting between gasiform materials and liquids or finely divided solid particles.

Another object of the invention is to improve contacting efficiency for vapor phase reactions carried out in the presence of a fluidized bed of solids by providing within said bed a plurality of perforate baffling means which will prevent or at least very substantially diminish the tendency of the gasiform material to flow laterally and then stream upwardly in cross channels, by-passing the main body of catalyst and thus escaping any substantial degree of catalyst contact.

A specific object of the invention is to improve gasiform and solids contacting in fluidized catalyst beds, particularly of naphtha with finely divided hydroforming catalyst particles in a reactor maintained at conventional hydroforming reaction conditions wherein the superficial upward velocity of the gasiform material effecting fluidization is relatively low, by disposing in said bed spaced, perforate baffle means affording low resistance to gas flow therethrough and of such form and construction as to minimize lateral gas flow.

These and other objects will appear more clearly from the detailed specification and claims which follow.

Briefly, the present invention in a specific modification involves improvements in the operation of a process employing fluidized solids effected by disposing within the dense fluidized bed one or a plurality of perforated baffles, the perforations of which are sufficiently large to permit gas flow therethrough at a low pressure decrease across the baffle or baffles, say one not exceeding about one-half p.s.i., the said baffles being of a configuration or shape as to form numerous pockets in or beneath the baffle to trap the rising gasiform material so that its flow horizontally is restricted and is forced up through that pocket of the baffle which it first entered. Channeling of large gas bubbles up one side of the bed, which occurs with conventional baffles, is thus prevented. In addition, any large gas bubbles or any massive solid streams will be broken up, redispersed, and redistributed by such baffles.

This invention includes several different baffle designs which will operate in the manner above described. The preferred design is a perforated wave-like or corrugated plate carrying a plurality of vertically disposed imperforate ribs or dams integral at least with the underside of the perforated plate, the planes of the dams being disposed at right angles to the axis of the corrugations. The ribs or dams may also extend above the plate, although this is not essential except possibly in certain liquid phase operations. A similar effect can also be obtained with a design consisting of a plurality of adjacent pyramids or cones, whose bases are all in the same horizontal plane, made of perforated plate or at least with openings near the top for the light phase and along the bottom for the dense phase. This baffle would trap the rising gases without the use of the vertical ribs or dams and redistribute the same or prevent channeling or large bubble formation. This design is more difficult to construct particularly in establishing the necessary ratio of the size and number of the openings at the upper part of the pyramids or cones to the size and number of openings at the base of the pyramids or cones. In both of these designs, the gas or lighter phase flows primarily up through the baffle peaks, and the solid or dense phase flows down mainly through the valleys, resulting in very uniform distribution of both streams over the vessel's entire cross section.

A possible modification consists of a gas trapping baffle as described above, except without perforations or other free area in the valleys, for use in vessels with a high net rate of solids flow from the bottom to the top of the unit, where no advantage may exist for permitting downflow of solids.

A further possible design consists of a flat horizontal perforated plate, on top of a gridwork of vertical imperforate ribs or dams, formed like an egg crate or honeycomb, to provide numerous cells or pockets beneath the baffle for trapping the rising gasiform material. The gridwork may also extend above the perforated plate, although this is not essential, except that in certain liquid flow cases such dams might be needed on the top side to "trap" and insure good distribution of liquid flowing down.

In the accompanying drawing there is set forth in Figure 1 the minimum essentials of a modern hydroforming plant equipped with baffles in accordance with the present invention.

Figure 2:
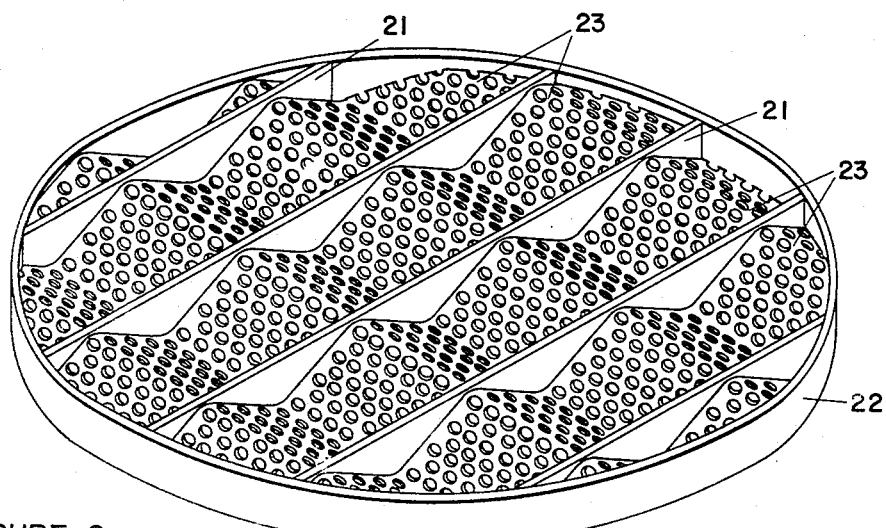

Figure 2 presents an isometric view of the bottom of a preferred form of the new and improved means of baffling forming a part of the present invention.

Figure 3:
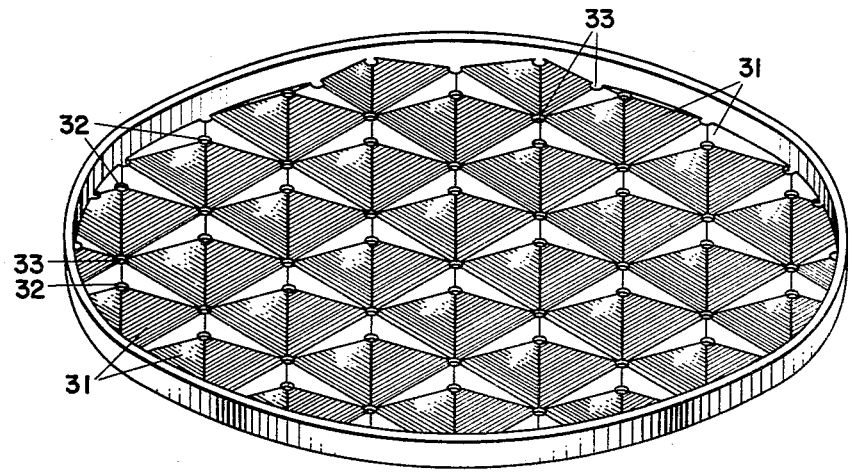
Figure 4:
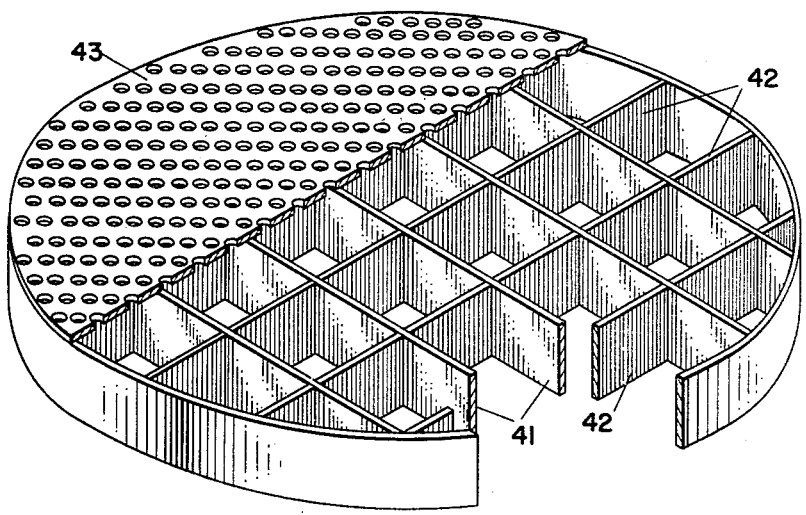

Figures 3 and 4 illustrate in isometric views two modifications of baffling means forming part of this invention.

Referring in detail to Figure 1, this figure represents a hydroforming reactor containing a fluidized bed of catalyst C disposed within the reactor as shown disposed on a gas distributing means or grid G and having an upper dense phase level L. The reactor contains two baffles F disposed as shown within the said reactor, said baffles being illustrated in greater detail in Figure 2 described below. Naphtha is fed to the system through line 2, passing thereafter through a furnace 3 and thence passing via line 4 into the bed of catalyst C in reactor 1. Simultaneously hydrogen-containing gas, usually obtained from the product recovery system and flowing in line 5, is forced through a furnace 6, then withdrawn from said furnace through line 7 and charged to the bottom of reactor 1. The heated oil vapors and hydrogen-containing gas flow upwardly through the bed of catalyst at a relatively low superficial velocity, say 0.2 to 2.0 feet per second; the catalyst which is in the form of a powder having a particle size of say 5 to 200 microns is fluidized by the gasiform material. For best fluidization the catalyst should contain about 7 to 25 wt. percent, preferably about 10–15 wt. percent of 0 to 40 micron particles, although because of great effectiveness of the baffling means in accordance with the present invention excellent contacting efficiency is realized even though the catalyst contains less than 4 wt. percent of 0–40 micron particles. Under the proper conditions of temperature, pressure and a suitable catalyst, the desired hydroforming occurs and the raw vapors pass from the bed of catalyst C into a gas separation space positioned between L and the top of the reactor wherein the main bulk of the catalyst is separated from the stream and descends toward the bed B. Before the vapors are withdrawn from the reactor, they are forced through one or more cyclones S wherein catalyst still entrained in the vapors is separated and returned to the bed by one or more dip pipes d. The vapors are withdrawn from the reactor via line 8, cooled to a temperature of about 100° F. in 9, thence conveyed by line 10 to a separator 11 wherein gasiform material is separated from the liquid material and recycled via line 12 to line 5 for further use in the process. Excess hydrogen-containing gas may be rejected from the system through line 13. The liquid product is withdrawn from the separator 11 through line 14 and charged to a fractional distillation column 15 from which product is recovered through line 16 and delivered to storage 17. Light material is withdrawn overhead from 15 through line 18 and utilized in known manner. Except for the baffles F disposed in reactor 1, the process indicated immediately above represents the minimum essentials of a commercial hydroforming plant employing the fluidized solids technique.

In Figure 2 there is a representation of a preferred form of the improved baffles. In the modification there shown, the baffles comprise several vertical imperforate rib members 21 arranged parallel to each other and secured at their ends to a supporting ring 22. A perforated undulating or corrugated baffle member 23 is arranged between each of the rib member 21 and between the outermost rib member and the supporting ring 22. The corrugated baffle members 23 are preferably secured along each edge as by welding to the contiguous rib member or supporting ring. It will be understood that the baffle structure can be built up in place in a reactor vessel in which event the supporting ring may, if desired, be eliminated. It is essential that the plane of the rib members be disposed at right angles to the axis of the corrugations and it is desirable that the rib members extend some distance below the corrugated baffle members, for example about 3 or 4 inches and preferably about 8 inches or more, depending upon the size of the unit and the distance to the level L of the dense bed. The rib members should preferably be deep enough to contact the upper surface of the dense bed. If desired, vertical, imperforate members may be arranged between the rib members and preferably beneath the valleys of the corrugated baffle members to prevent or hinder lateral flow or movement of the gases or vapors between the rib members. The vertically disposed imperforate ribs or dams trap the upflowing gasiform material and restrict it in horizontal motion to the distances indicated in the drawing, thus forcing the said gasiform material up through the peak in that section of the baffle which is first entered. The gas-solids contacting efficiency is greatly improved, because the gasiform material is thus prevented from flowing laterally towards the inner wall of the reactor agglomerating with gas in other areas of the vessel and then channeling upwardly in the form of either a continuous stream or large gas bubbles. The gases flow primarily up through the baffle peaks and the solids flow down through the valleys, resulting in very uniform distribution of both streams over the vessel's entire cross section. The perforations in the baffle means proper which are of the order of one-half to three inches in diameter, are closely spaced, so that the free area of the baffle is from about 10 to 50%, preferably 20 to 40% of the total cross-sectional area of the reactor. The pressure drop through the baffle means preferably does not exceed 0.5 p.s.i. so that some solids can flow down through the baffles which cause the formation of a minimum dilute or disperse phase of catalyst and gasiform material below the baffles thus permitting substantially complete utilization of the volume of the reactor space.

It is pointed out that the perforations in the baffles comprise, in a preferred modification, 25% free area, that the perforations may be of the order of one and one-half inches in diameter and spaced apart three and three-eighth inches from the center to center and that the height of the peaks from the base of the depressions or valleys may be of the order of about six to twelve inches and furthermore the planes formed by the corrugations may be at an angle of about 45° to about 55° with the horizontal corresponding to a corrugation angle of from about 90° to about 70°. The baffles may be constructed from perforate steel having a thickness of ¼".

A number of factors are involved in determining the optimum pressure drop (and hence free area) for such a baffle. The pressure drop should be high enough to prevent any major maldistribution of gas, and to prevent "Gulf Stream" catalyst flow. At the same time, it should be low enought to prevent appreciable power loss and solids attrition, and permit sufficient solids downflow to minimize solids classification and limit the size of the disperse phase beneath the baffle. The optimum is in the range of 0.1 to 0.5 p.s.i. at fluid hydroforming conditions.

Figures 3 and 4 illustrate modified forms of baffles which are capable of giving results that are comparable with those achieved with the baffle arrangement of Figure 2. The baffle shown in Figure 3 comprises a multiplicity of vertical, tapered members 31 in the form of hollow cones or pyramids having openings 32 at or near their apexes for the discharge of upflowing gas or vaporiform material alone or in admixture with finely divided solid contact or catalyst particles and additional openings 33 at or near their bases for the discharge or recirculation of solid contact or catalyst particles to the space below the baffle or gas redistribution means. The size and the number of holes for the members 31 may be the same or different at the edges as compared with the center of the baffle and the gas discharge holes may, if desired, be so situated or formed as to impart a swirling movement to the dense fluidized bed. In this arrangement, the base of each cone or pyramid, or the like, serves as a cell or trap causing the gas to pass upwardly through the said cone and out at the top thereof and thereby preventing the accumulation and discharge of a major portion of the gaseous or vaporous material through a small or limited area of the baffle.

The baffle of Figure 4 comprises a plurality of vertical, imperforate sheets or strips of metal 41 and 42 secured at least at their ends to the inner wall of the vessel or to a mounting ring or the like for attachment to the interior of the vessel. The sheets or ribs 41 and 42 are arranged at a suitable angle to each other, desirably at a 90° angle in order to form an egg-crate or cellular structure which limits lateral or cross flow of gaseous or vaporous materials during their passage therethrough. A perforated plate or grid 43 is secured to the top of the sheets or ribs 41 and 42 in order to redisperse the gaseous or vaporous materials as they are discharged from each of the cells formed by the sheets or ribs 41 and 42. Similarly to the perforated sheets of the baffle illustrated in Figure 2, the size and distribution of the holes in grid 43 is such that a low pressure drop, i.e. less than about 0.5 p.s.i. is taken in passing through the baffle assembly. This form of baffle is very simple to construct and yet is highly effective in achieving uniform distribution of the gas or vapor flow because of the cellular structure beneath the grid.

A 5-foot diameter high pressure fluidization unit having a height of 40 feet was utilized to study contacting efficiency of gases with finely divided solids. The solids used in the study were a hydroforming catalyst consisting of about 10 wt. percent $MoO_3$, 88 wt. percent $Al_2O_3$ and 2 wt. percent $SiO_2$. The unit was pressurized to 80 p.s.i.g. and the catalyst particles were fluidized with air at 0.8 ft. per second superficial velocity, conditions which simulate closely the fluidization in commercial fluid hydroformers. Using helium tracer methods, the contacting efficiency was determined and compared with the contacting efficiency that was determined for the particular hydroforming catalyst in a 15-inch diameter, 40-foot high fluid hydroforming pilot plant. Studies were made with a coarse catalyst mixture containing only 4 wt. percent of 0–40 micron particles, with a second mixture containing 7–8 wt. percent of 0–40 micron particles and a third mixture containing about 10–11 wt. percent of 0–40 micron particles in the unbaffled vessel and in the unit when provided with corrugated, perforated baffles as shown in Fig. 2 in which the vertical plates or dams spaced about one foot apart to which strips of plate with evenly spaced holes ¾″ in diameter (32% free area) folded into corrugations 6″ deep were welded along their edges. The data are summarized in Table I.

*Table I*

| Wt. Percent 0–40 Micron | Baffle | Relative Contacting Efficiency | |
|---|---|---|---|
| | | Wt. Percent | Vol. Percent |
| 4 | None | 43 | 46 |
| 7–8 | ___do___ | 76 | 87 |
| 10–11 | ___do___ | 91 | 97 |
| 4 | 2 Corrugated Baffles | 82 | 94 |
| 7–8 | ___do___ | 91 | 96 |
| 10–11 | ___do___ | 94 | 94 |

These data show that the corrugated baffles in accordance with the present invention effect a substantial improvement in contacting efficiency upon a weight basis as well as upon a volumetric basis with catalyst compositions deficient in fines (4% 0–40 micron material) as well as with compositions containing sufficient fines to permit good fluidization. The baffles were most effective in improving the contacting efficiency with the catalyst containing only 4 wt. percent of 0–40 micron particles.

The advantage of low-pressure baffles in fluidized beds lies in the fact that they permit a reasonable amount of dumping or catalyst movement through the baffles. This helps to decrease disperse phase formation and prevent catalyst segregation. However, too much dumping is also harmful since this will permit emulsion gas backmixing. Experimental studies involving radioactive solids mixing tests in the high pressure fluidization unit of Example 1 have shown that the dumping rate is a function of (1) free area and (2) fines concentration. Increasing both tends to increase catalyst dumping. In general, the lower the fines (0–40 micron) concentration the greater the free area of the baffle may be.

Corrugated, perforated baffles have been shown above to improve contacting efficiency in fluid beds. However, they have a drawback common to most baffles—they reduce the amount of catalyst held up in the bed. The reason for this is that there is a zone of low concentration below each baffle. As a result, it has been determined that there is an optimum number of baffles to be used; with more than the optimum number, the decreased catalyst inventory more than counterbalances the small further improvement in efficiency. Specifically, it has been found that for a fluid hydroformer with a bed depth of about 40 ft., it is most advantageous to utilize two spaced cellularized baffles in accordance with this invention if the catalyst contains adequate fines for good fluidization (i.e. 10 wt. percent or more of 0–40 micron particles) and three such baffles when the catalyst is low in fines or contains less than about 7–8 wt. percent usually less than 4–5 wt. percent of 0–40 micron particles.

The foregoing specification contains only a limited number of embodiments of the present invention. It will be understood that this invention is not limited thereto since numerous variations are possible without departing from the scope of the claims herein.

What is claimed is:

1. A method for improving the inter-phase contacting in a multi-phase fluidized solids process which comprises causing a lighter gasiform phase to flow upwardly through a dense phase comprising particulate fluidizable solids, subdividing the upwardly flowing lighter gasiform phase passing through a lower portion of the dense phase into a plurality of small confined and separated streams and baffling lateral flow of said streams, then further subdividing each of said confined streams into a multiplicity of smaller streams which are discharged into and intimately dispersed in the dense phase immediately thereabove.

2. A method for improving gas-solids contact in a fluidized bed of solids which comprises charging finely-divided solids to a reaction zone, introducing a gasiform material at the bottom of said reaction zone at a velocity sufficient to maintain said finely divided solids as a dense fluidized bed, subdividing the upwardly flowing gasiform material passing through a lower portion of the dense fluidized bed into a plurality of small confined streams and preventing lateral flow of said streams, then further subdividing each of said confined streams into a multiplicity of smaller streams which are discharged into and intimately dispersed in the dense fluidized bed immediately thereabove.

3. A method for improving gas-solids contact in a fluidized bed of solids which comprises charging finely divided solids to a reaction zone, introducing a gasiform material at the bottom of said reaction zone at a velocity sufficient to maintain said finely divided solids as a dense, fluidized bed, subdividing the upwardly flowing gasiform material passing through a lower portion of the dense fluidized bed into a plurality of small confined streams and preventing lateral flow of said streams, then further subdividing each of said confined streams into a multiplicity of smaller streams which are discharged into and intimately dispersed in the dense fluidized bed immediately thereabove and discharging a limited amount of the solids in the last named fluid bed downwardly into each of said small confined streams of upwardly flowing gasiform material.

4. An improved method for hydroforming hydrocarbon fractions boiling within the motor fuel or naphtha boiling range which comprises charging a reaction zone with finely divided hydroforming catalyst, introducing naphtha vapors and hydrogen-containing gas thereto at a superficial velocity of from about 0.4 to about 2.0 ft. per second sufficient to maintain the catalyst as a dense, fluidized bed, maintaining the reaction zone at a temperature between about 850 and 1000° F. and at pressures of up to about 500 p.s.i.g., subdividing the upwardly flowing vaporous and gaseous materials passing through a lower portion of the dense fluidized bed of finely divided hydroforming catalyst into a plurality of small, confined streams and preventing lateral flow of said streams, then further subdividing each of said confined streams into a multiplicity of smaller streams which are discharged into and intimately dispersed in the dense, fluidized bed of catalyst immediately thereabove.

5. An improved method for hydroforming hydrocarbon fractions boiling within the motor fuel or naphtha boiling range which comprises charging a reaction zone with finely divided hydroforming catalyst, introducing naphtha vapors and hydrogen-containing gas thereto at a superficial velocity of from about 0.4 to about 2.0 ft. per second sufficient to maintain the catalyst as a dense, fluidized bed, maintaining the reaction zone at a temperature between about 850 and 1000° F. and at pressures of up to about 500 p.s.i.g., subdividing the upwardly flowing vaporous and gaseous materials passing through a lower portion of the dense fluidized bed of finely divided hydroforming catalyst into a plurality of small, confined streams and preventing lateral flow of said streams, then further subdividing each of said confined streams into a multiplicity of smaller streams which are discharged into and intimately dispersed in the dense, fluidized bed of catalyst immediately thereabove and discharging a limited amount of the catalyst in the last named fluidized bed into each of said small confined streams of upwardly flowing vaporous and gaseous materials.

6. A reactor vessel, means for supplying gasiform material at the bottom of said vessel, means for removing gasiform material from the top of said vessel, redistributing means arranged at at least one intermediate level within said vessel comprising a plurality of imperforate wall members arranged to subdivide the cross sectional area of the reactor into a plurality of relatively small, vertical passageways each of which confines an upward flowing stream therein to prevent lateral flow and perforated baffle means at the top of each of said passageways with a number of perforations to subdivide the thus confined stream from each of said passageways.

7. A reactor vessel, means for supplying gasiform material at the bottom of said vessel, means for removing gasiform material from the top of said vessel, redistributing means arranged at at least one intermediate level of said vessel comprising a plurality of vertical, imperforate rib members arranged in spaced relation across said vessel dividing that portion of the reactor into a plurality of vertical passageways, and perforated corrugated metal grid members arranged between said rib members with the axis of the corrugations at right angles to the plane of said rib members, said rib members and said corrugated grid members confining upwardly flowing gasiform material into a number of streams prevented from flowing laterally before said streams are subdivided in flowing through perforations of the corrugated metal grid members.

8. A reactor vessel, means for supplying gasiform material at the bottom of said vessel, means for removing gasiform material from the top of said vessel, redistributing means arranged at at least one intermediate level of said vessel comprising a plurality of vertical, imperforate rib members arranged in spaced relation across said vessel dividing that portion of the reactor into a plurality of vertical passageways to subdivide gasiform material flowing upwardly therethrough into small confined streams, and perforated corrugated metal grid members with a multiplicity of perforations arranged between said rib members with the axis of the corrugations at right angles to the plane of said rib members to further subdivide said confined streams into a multiplicity of smaller streams, said rib members extending several inches below the bottom of the valleys of said corrugated grid members.

9. The apparatus as defined in claim 8 in which the perforated grid members have a free area of about 10 to 50% of the vessel cross section.

10. A reactor vessel, means for supplying gasiform material at the bottom of said vessel, means for removing gasiform material from the top of said vessel, redistributing means arranged at at least one intermediate level within said vessel comprising a plurality of vertical, imperforate wall members arranged in criss-cross relation to divide that portion of the vessel into a plurality of relatively small vertical passageway cells from which lateral flow of gas flowing up through each cell is prevented by said wall members, and a perforated grid member having a multiplicity of perforations secured to the tops of said imperforate wall members to effect a redistribution of the gases discharged from said cells as smaller streams than the stream passing through each of said cells.

11. The apparatus as defined in claim 10 in which the perforated grid member has a free area of about 10 to 50% of the vessel cross section.

12. A reactor vessel, means for supplying gasiform material at the bottom of said vessel, means for removing gasiform material from the top of said vessel, redistributing means arranged at at least one intermediate level within said vessel comprising a plurality of essentially cone-shaped redistributing elements arranged within the vessel with their bases essentially in one horizontal plane, perforations in the upper portions of said cone-shaped elements for the discharge of gaseous materials and perforations at the lower portion of said cone-shaped elements for the discharge of finely divided solids therethrough, each cone-shaped element forming a passage in which an upflowing stream of gasiform material is confined and prevented from moving laterally to an adjacent cone-shaped element.

13. A reactor vessel for the contacting of gasiform materials with a dense fluidized bed of finely divided solid particles comprising a vertical vessel, means for supplying gasiform materials to the bottom portion of said vessel and means for removing gasiform material from the upper portion of said vessel, redistributing means arranged at at least one intermediate level within the dense fluidized bed comprising a baffle member provided with openings for the upward passage of gasiform materials and finely divided solids and for the downward passage of finely divided solids and entrained gasiform material, cellular means provided on the under side of said redistributing means for trapping the rising gas streams and minimizing the lateral flow thereof, thereby achieving more uniform distribution of the gasiform material in the zone above the said redistributing means than prevailed in the bed immediately below said redistributing means.

(References on following page)

References Cited in the file of this patent

UNITED STATES PATENTS

| | | |
|---|---|---|
| 2,472,502 | Tyson | June 7, 1949 |
| 2,581,134 | Odell | Jan. 1, 1952 |
| 2,606,104 | Hogan et al. | Aug. 5, 1952 |
| 2,740,752 | Anhorn | Apr. 3, 1956 |
| 2,777,760 | Dineen et al. | Jan. 15, 1957 |
| 2,816,857 | Hemminger | Dec. 17, 1957 |

FOREIGN PATENTS

| | | |
|---|---|---|
| 120,335 | Australia | Sept. 13, 1945 |